United States Patent
Xu et al.

(10) Patent No.: US 10,757,061 B1
(45) Date of Patent: Aug. 25, 2020

(54) CROSS-MODAL EVENT SUMMARIZATION SYSTEM BASED ON NETWORK OF NETWORKS REPRESENTATIONS

(71) Applicant: HRL Laboratories, LLC, Malibu, CA (US)

(72) Inventors: Jiejun Xu, Chino, CA (US); Samuel D. Johnson, Santa Monica, CA (US); Kang-Yu Ni, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 202 days.

(21) Appl. No.: 15/680,069

(22) Filed: Aug. 17, 2017

Related U.S. Application Data

(60) Provisional application No. 62/376,758, filed on Aug. 18, 2016.

(51) Int. Cl.
  *H04L 12/58* (2006.01)
  *G06Q 30/02* (2012.01)
(52) U.S. Cl.
  CPC ......... *H04L 51/32* (2013.01); *G06Q 30/0252* (2013.01)
(58) Field of Classification Search
  None
  See application file for complete search history.

(56) References Cited

U.S. PATENT DOCUMENTS

| | | | |
|---|---|---|---|
| 9,244,976 B1 * | 1/2016 | Zhang | G06F 16/2453 |
| 2008/0288482 A1 * | 11/2008 | Chaudhuri | G06F 16/24556 |
| 2015/0089409 A1 * | 3/2015 | Asseily | G06Q 10/10 715/765 |
| 2016/0110433 A1 * | 4/2016 | Sawhney | G06F 16/9535 707/722 |
| 2016/0117406 A1 * | 4/2016 | Agrawal | G06F 16/3346 707/749 |
| 2016/0274705 A1 * | 9/2016 | Kapadia | A63F 13/60 |

OTHER PUBLICATIONS

J. Bian, Y. Yang, H. Zhang, and T. Chua. Multimedia summarization for social events in microblog stream. IEEE Trans. Multimedia,17(2): pp. 216-228, 2015.

Z. Cao, C. Chen, W. Li, S. Li, F. Wei, and M. Zhou. Tgsum: Build tweet guided multi-document summarization dataset. In AAAI, 2016, pp. 1-8.

C. A. Cassa, R. Chunara, K. Mandl, and J. S. Brownstein. Twitter as a sentinel in emergency situations: Lessons from the Boston marathon explosions. In PLoS Currents 5, 2013, pp. 1-9.

(Continued)

*Primary Examiner* — Angela Nguyen
(74) *Attorney, Agent, or Firm* — Tope-McKay & Associates

(57) ABSTRACT

Described is a system for automated event summarization. A multi-layer network representing a multimodal data set is generated, where nodes within a given layer represent information tokens in a given modality. A topically diverse set of nodes is ranked and selected from each layer to represent temporal event highlights. Temporal event highlights are linked into storylines. Using the storylines, the system monitors a progression of an event or opinions regarding a topic. A temporal summary of the progression of the event or the opinions regarding the topic is generated.

22 Claims, 8 Drawing Sheets

(56) References Cited

OTHER PUBLICATIONS

Y. Jia, E. Shelhamer, J. Donahue, S. Karayev, J. Long, R. Girshick, S. Guadarrama, and T. Darrell. Caffe: Convolutional architecture for fast feature embedding. In ACM MM, 2014, pp. 675-678.
M. A. Kader, S. M. Naim, A. P. Boedihardjo, and M. S. Hossain. Connecting the dots using contextual information hidden in text and images. In AAAI, 2016, pp. 4220-4221.
G. Kim and E. P. Xing. Reconstructing storyline graphs for image recommendation from web community photos. In Proceedings of the IEEE Conference on Computer Vision and Pattern Recognition, pp. 3882-3889, 2014.
K. Rudra, S. Banerjee, N. Ganguly, P. Goyal, M. Imran, and P. Mitra. Summarizing situational tweets in crisis scenario. In ACM Conference on Hypertext and Social Media, 2016, pp. 137-147.
D. Shahaf, C. Guestrin, E. Horvitz, and J. Leskovec. Information cartography. Commun. ACM, 58(11): pp. 62-73, Oct. 2015.
L. Shi, H. Tong, J. Tang, and C. Lin. Flow-based influence graph visual summarization. In 2014 IEEE International Conference on Data Mining, pp. 983-988, 2014.
K. Shim. Mapreduce algorithms for big data analysis. Proc. VLDB Endow., 5(12): pp. 2016-2017, Aug. 2012.
J. Xu and T.-C. Lu. Seeing the big picture from microblogs: Harnessing social signals for visual event summarization. In International Conference on Intelligent User Interfaces, 2015, pp. 62-66.
X. Zhu, A. B. Goldberg, J. V. Gael, and D. Andrzejewski. Improving diversity in ranking using absorbing random walks. In Human Language Technologies 2007: The Conference of the North American Chapter of the Association for Computational Linguistics, HLT-NAACL, pp. 97-104, 2007.
Dijkstra, E. W. A Note on Two Problems in Connection with Graphs. Numerische Math, 1, pp. 269-271, 1959.

* cited by examiner

Day 11: uconn to the h t t p : / / t . co/iqaclz15tl final four #marchmadness
Day 12: final four: (1) florida (7) uconn (2) wisconsin (8) kentucky #marchmadness h t t p : / / t .co/iqaclz1
Day 16: check out florida's road to the final four! #marchmadness
Day 17: final four! florida vs uconn ! #marchmadness
Day 18: kentucky vs uconn #marchmadness
Day 19: uconn vs kentucky tonight #marchmadness
Day 20: uconn !!! #marchmadness

FIG. 7

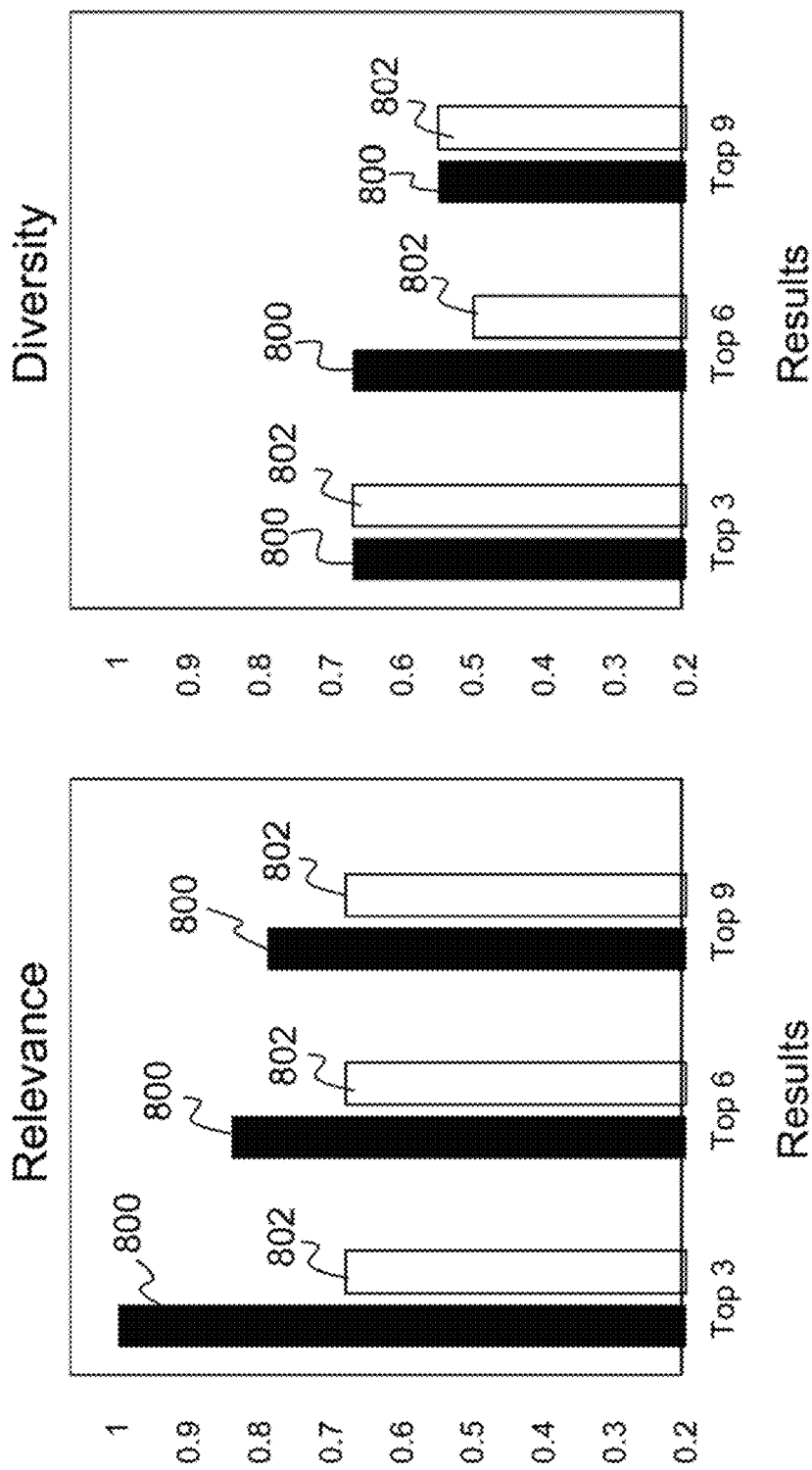

CROSS-MODAL EVENT SUMMARIZATION SYSTEM BASED ON NETWORK OF NETWORKS REPRESENTATIONS

CROSS-REFERENCE TO RELATED APPLICATIONS

This is a Non-Provisional Application of U.S. Provisional Patent Application No. 62/376,758, filed Aug. 18, 2016, entitled, "A Cross-Modal Event Summarization System Based on Network of Networks Representation", the entirety of which is incorporated herein by reference.

BACKGROUND OF INVENTION

(1) Field of Invention

The present invention relates to a system for automated event summarization and, more particularly, to a system for automated event summarization that leverages publicly available data from online sources.

(2) Description of Related Art

Publicly available online data is becoming increasingly abundant due to the prevalence of digital sources ranging from consumer sensors to social media. Such data availability has direct impact on forensic and intelligence analysis. The early investigation of Boston Marathon bombing tragedy was one of the first events to show the power of leveraging publicly available data (see the List of Incorporated Literature References, Literature Reference No. 3). However, the investigation was largely done without the aid of computational tools and required human analysts to sift through massive amounts of data by hand—a time-consuming process that may have hindered more efficient and effective response decisions.

To address this problem, automated event summarization has emerged as an active research area (see Literature Reference Nos. 5, 7, and 11). The primary goal of this research is to provide an analyst with a concise summary of a specific event to help narrow down the scope of their analysis. For instance, in Literature Reference No. 8, the authors introduced a methodology named "Metro Maps" to generate a structured set of text documents (e.g., news articles) for real-world event summarization. Their method explicitly models the relationships between documents, which is done by solving an optimization function based on word repetitions, in order to show progression stages of events.

In Literature Reference No. 7, the authors explored microblogging platforms, such as Twitter, to extract situational awareness messages for event summarization. To address the extremely short form nature of microblogs, an integer linear program using the word graph representation of the tweets was optimized in order to select the most relevant tweets. Compared to news articles, microblogs are updated in a much more timely fashion and are able to provide substantial advantage urgent event scenarios (e.g., natural disasters), as crucial information can be extracted much more rapidly.

With the prevalence of multimedia content, such as images and videos being shared on social media, the problem of visual event summarization has been recently investigated (see Literature Reference No. 11). Visual content is an important complement to text-based summaries, providing vivid descriptions of the different aspects of an event. In their work, the problem was addressed by an implicit crowdsourcing approach in which human users serve as collective filters to distill and identify the most useful images without computational visual analysis. A heterogeneous graph-based framework was proposed to model and analyze the interrelationship among users.

The visual content of images has also been modeled explicitly in some recent works. A cross-media probabilistic model was proposed in Literature Reference No. 1 to align text and image for microblog trending topic summarization. Similarly, in Literature Reference No. 5, an approach leveraging recent developments in deep learning where a convolutional neural network is used to extract key facial points was proposed that connects people across news articles to summarize their activities in context.

The aforementioned summarization techniques either focused on generating an event storyline across time using textual data or utilizing a combination of text and images to show the event highlights as a whole without showing its temporal progression. Thus, a continuing need exists for a system that aims to generate rich-in-content event storylines that cover temporal highlights by fusing multiple media types that are complementary to each other.

SUMMARY OF INVENTION

The present invention relates to a system for automated event summarization and, more particularly, to a system for automated event summarization that leverages publicly available data from online sources. The system comprises one or more processors and a non-transitory computer-readable medium having executable instructions encoded thereon such that when executed, the one or more processors perform multiple operations. The system connects electronically with a plurality of media networks and automatically acquires temporal event data. Using the temporal event data, the system generates a multi-layer network representing a multimodal data set, wherein nodes within a given layer represent information tokens in a given modality. The system ranks and selects a topically diverse set of nodes from each layer to represent temporal event highlights. The temporal event highlights are linked into a storyline, and the storyline is electronically communicated.

In another aspect, the storyline comprises at least one of the progression of the event and the opinions regarding the topic is generated by fusing temporal event highlights from multiple media types.

In another aspect, if the storylines indicate a convergence of opinions regarding a topic related to a consumer product, then the one or more processors further perform an operation of causing an advertisement related to the consumer product to be displayed to one or more social media users.

In another aspect, the system determines tuples whose nodes are connected, wherein each tuple contains at most one node from each layer. A fitness score is assigned to each tuple, and sets of tuples are selected from each layer based on the fitness scores.

In another aspect, edges linking nodes within a layer are computed based on node similarities, and edges linking nodes across layers link complementary information tokens describing different aspects of the same event.

In another aspect, the system stitches selected tuples together in a temporal sequence to generate the storyline.

In another aspect, selected tuples are stitched together using a shortest-path algorithm.

In another aspect, the multimodal data set comprises microblog posts, news articles, and images that describe at least one of current attitudes, trends, and events being shared online.

In another aspect, members of a tuple are connected via cross-layer edges.

In another aspect, in selecting the at least one set of tuples, the system simultaneously optimizes a plurality of objectives, wherein the plurality of objectives comprises an objective to return nodes from each of a set of topics; an objective to return nodes that are central with respect to their respective topics; and an objective to return tuples of nodes from different modalities that are topically related.

In another aspect, to simultaneously optimize the plurality of objectives, the system forms tuples by selecting and combining a set of intermediate results computed by applying a random walk method in each of the layers, such that tuples are formed that span across layers.

In another aspect, the fitness score is a sum of individual node scores from each layer, wherein the individual node scores are computed using a random walk method.

In another aspect, the storyline is electronically communicated through at least one of a display, a network card, a social network, and electronic mail.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7 is an illustration of sample tweets from one NCAA storyline according to some embodiments of the present disclosure;

FIG. 8A is an illustration of evaluation of the relevance of the content embedded in storylines according to some embodiments of the present disclosure; and FIG. 8B is an illustration of evaluation of the diversity of the content embedded in storylines according to some embodiments of the present disclosure.

DETAILED DESCRIPTION

Figure 1:
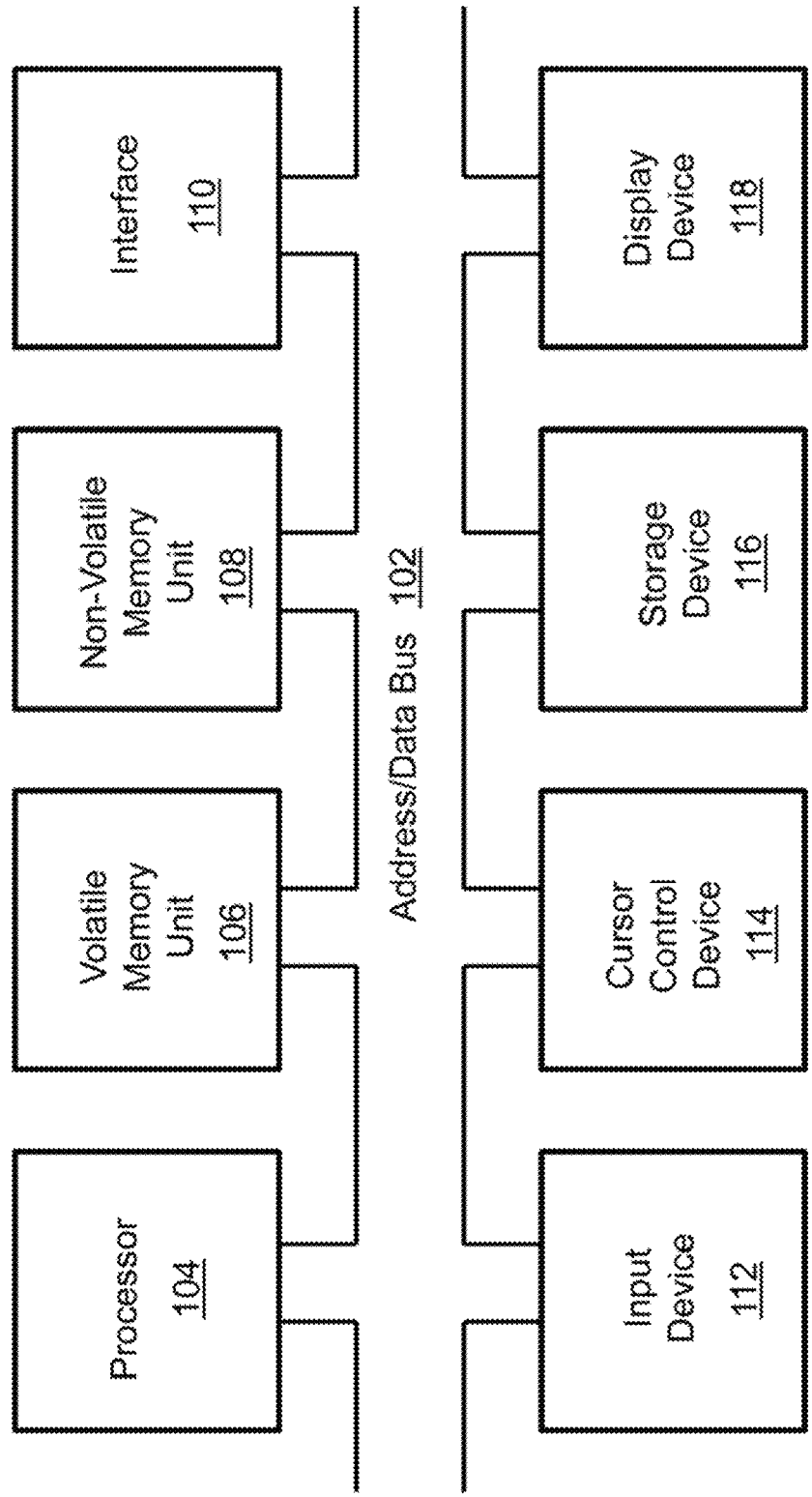
FIG. 1 is a block diagram depicting the components of a system for automated event summarization according to some embodiments of the present disclosure.

The present invention relates to a system for automated event summarization and, more particularly, to a system for automated event summarization that leverages publicly available data from online sources. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. J. Bian, Y. Yang, H. Zhang, and T. Chua. Multimedia summarization for social events in microblog stream. IEEE Trans. Multimedia, 17(2):216-228, 2015.
2. Z. Cao, C. Chen, W. Li, S. Li, F. Wei, and M. Zhou. Tgsum: Build tweet guided multi-document summarization dataset. In AAAI, 2016.
3. C. A. Cassa, R. Chunara, K. Mandl, and J. S. Brownstein. Twitter as a sentinel in emergency situations: Lessons from the Boston marathon explosions. In PLoS Currents 5, 2013.
4. Y. Jia, E. Shelhamer, J. Donahue, S. Karayev, J. Long, R. Girshick, S. Guadarrama, and T. Darrell. Caffe: Convolutional architecture for fast feature embedding. In ACM MM, 2014.
5. M. A. Kader, S. M. Naim, A. P. Boedihardjo, and M. S. Hossain. Connecting the dots using contextual information hidden in text and images. In AAAI, 2016.
6. G. Kim and E. P. Xing. Reconstructing storyline graphs for image recommendation from web community photos. In Proceedings of the IEEE Conference on Computer Vision and Pattern Recognition, pages 3882-3889, 2014.
7. K. Rudra, S. Banerjee, N. Ganguly, P. Goyal, M. Imran, and P. Mitra. Summarizing situational tweets in crisis scenario. In ACM Conference on Hypertext and Social Media, 2016.
8. D. Shahaf, C. Guestrin, E. Horvitz, and J. Leskovec. Information cartography. Commun. ACM, 58(11):62-73, October 2015.
9. L. Shi, H. Tong, J. Tang, and C. Lin. Flow-based influence graph visual summarization. In 2014 IEEE International Conference on Data Mining, pages 983-988, 2014.
10. K. Shim. Mapreduce algorithms for big data analysis. Proc. VLDB Endow., 5(12):2016-2017, August 2012.
11. J. Xu and T.-C. Lu. Seeing the big picture from microblogs: Harnessing social signals for visual event summarization. In International Conference on Intelligent User Interfaces, 2015.
12. X. Zhu, A. B. Goldberg, J. V. Gael, and D. Andrzejewski. Improving diversity in ranking using absorbing random walks. In Human Language Technologies 2007: The Conference of the North American Chapter of the Association for Computational Linguistics, HLT-NAACL, pages 97-104, 2007.
13. Dijkstra, E. W. A Note on Two Problems in Connection with Graphs. Numerische Math, 1, 269-271, 1959.

(2) PRINCIPAL ASPECTS

Various embodiments of the invention include three "principal" aspects. The first is a system for automated event summarization and, more particularly, to a system for automated event summarization that leverages publicly available data from online sources. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
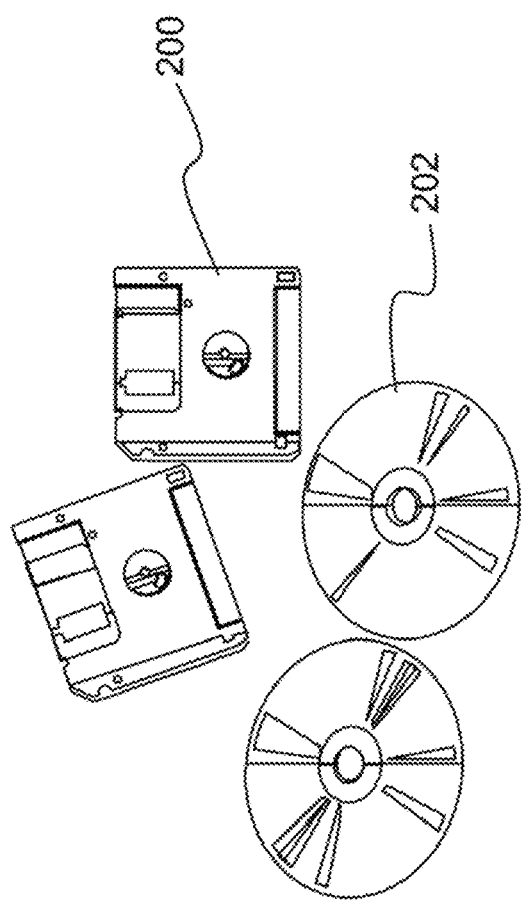
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is the design and implementation of an automated event summarization system that leverages publicly available data from online sources. A unique Network of Networks (NoN) model (a multi-layer network) is used to represent a multimodal data set comprising microblog posts, social network posts, news articles, and images that describe current attitudes, trends, and events being shared by individuals and organizations. The multimodal data set may be acquired directly from social networks, blogs, microblogs, news websites, and other online information sources. Modality refers to a data source; thus, the multimodal data set is a collection of data from various modalities (or data sources). In this model, networks are arranged in layers that represent the different modalities, and the nodes within a given layer account for the information in that modality. Edges connect pairs of nodes—possibly from different modalities—based on the topical similarity of the content.

A unique ranking algorithm selects a topically diverse collection of nodes across the different layers (i.e., tuples) that serve as representative highlights of the events described in the network. A topically diverse collection of nodes is a collection of nodes representing differing topics. The topics could vary from a political topic, a sports topic, or a general news topic. Tuples are subsequently stitched together in a temporal sequence in order to generate a consistent event storyline. This stitching is accomplished by framing the problem as a modified longest path problem in a directed acyclic graph. The system according to embodiments of the present disclosure has been fully implemented using parallel computing paradigms for scalable data processing and real-time analysis, and initial experiments have been conducted on real-world events to demonstrate the effectiveness of the system.

Figure 3:
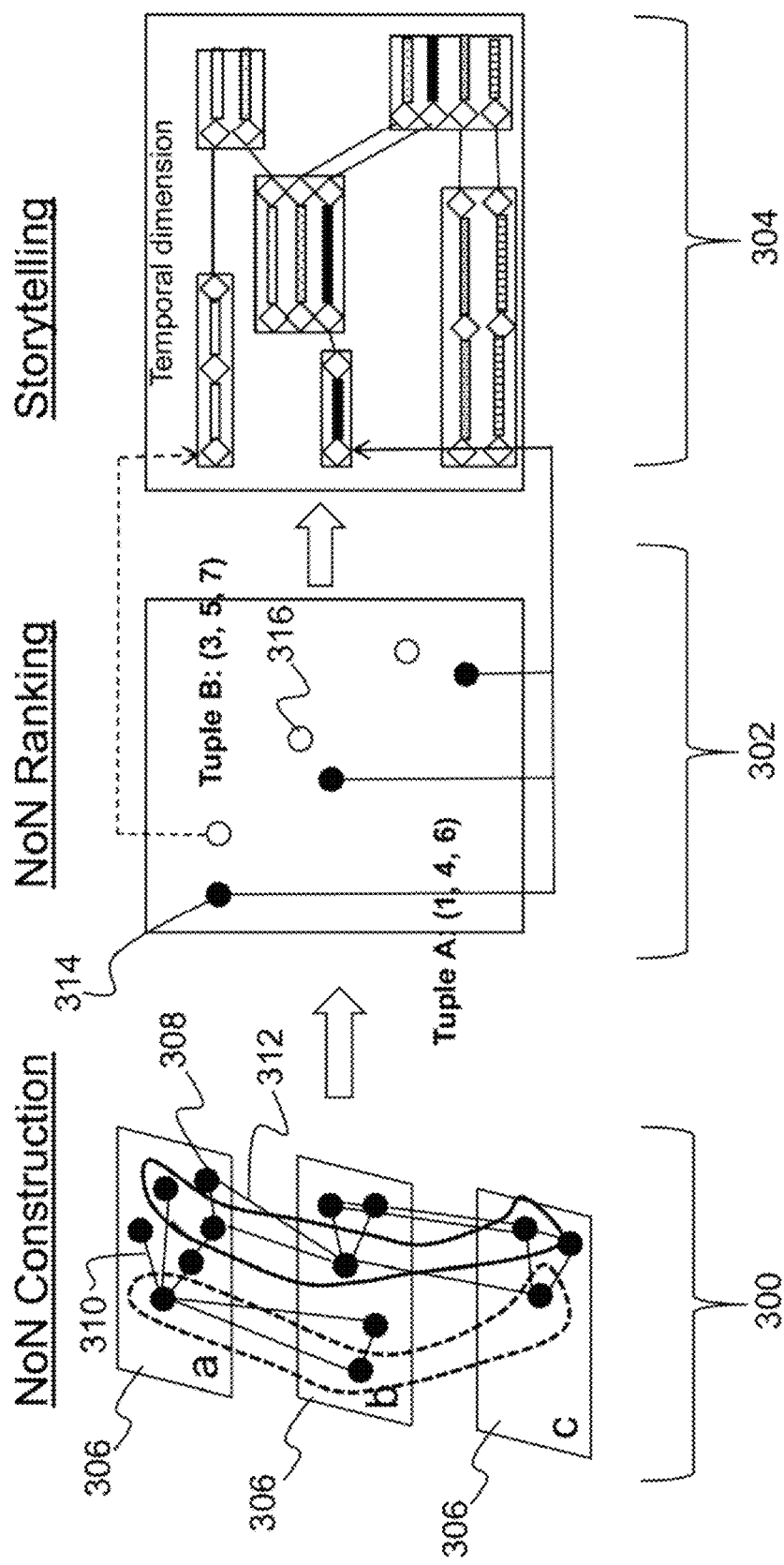
FIG. 3 is an illustration of the network of networks (NoN) construction, ranking, and storytelling according to some embodiments of the present disclosure.

As depicted in FIG. 3, some key contributions of the system described herein include: i) a Network of Networks (NoN) model 300 with different layers (i.e., a multi-layer network) to represent multimodal data sources; ii) a ranking mechanism 302 to select sets of nodes (tuples) from each layer to represent event highlights; and iii) an association algorithm 304 to link temporal event highlights into consistent storylines. Each of which are described below with respect to Twitter® Tweets®. It should be noted that although Tweets® are used for illustrative purposes, the invention is not intended to be limited thereto. Thus, the system as described in further detail below can be employed with any suitable network in which there are posts that may reflect a particular event. Each of these aspects will be described in further detail below.

(3.1) Methodology

The summarization framework according to embodiments of this disclosure has three technical components that are described in further detail below.

(3.1.1) NoN Construction (Element 300)

Figure 4:
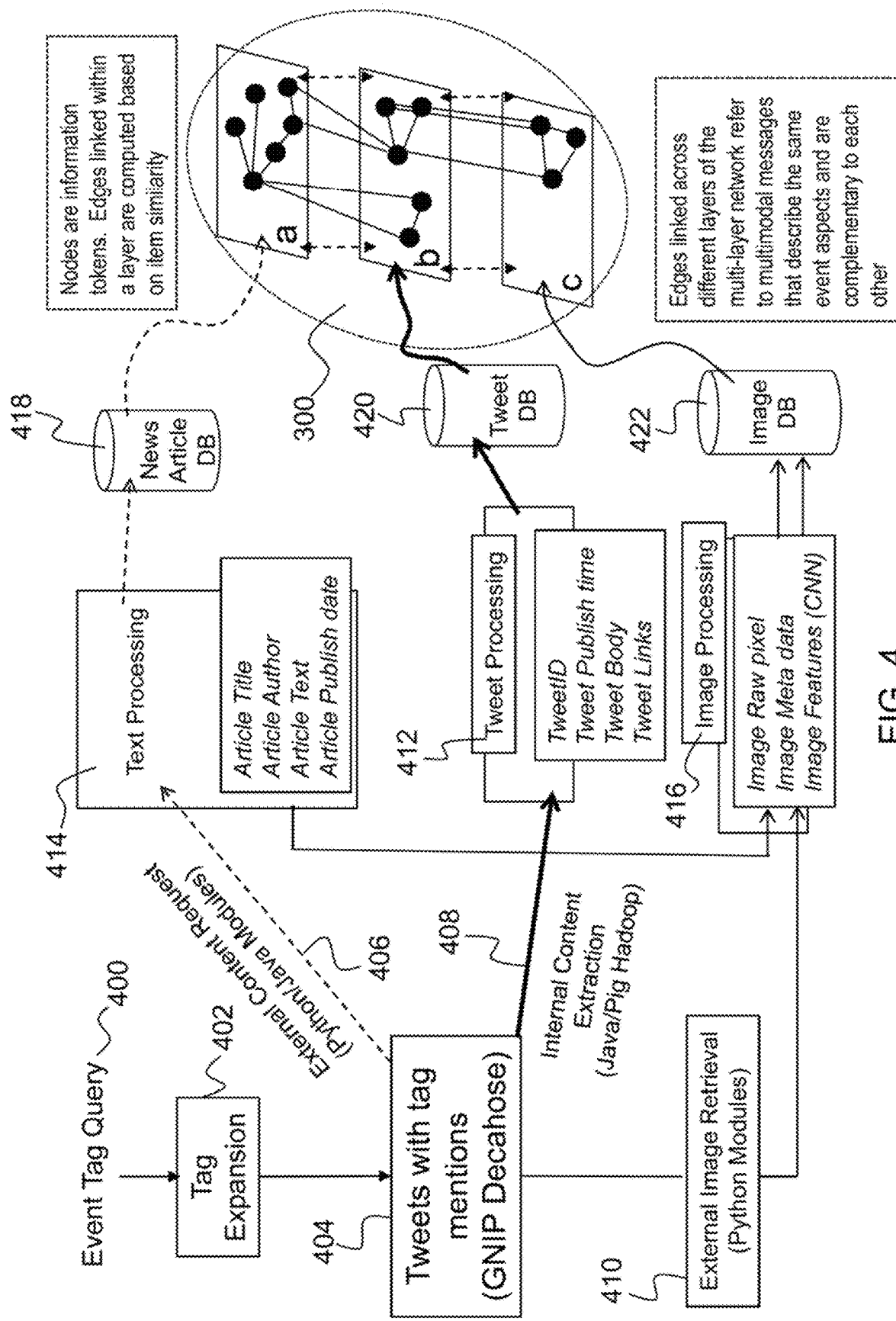
FIG. 4 is an illustration of multimodal data collection and NoN construction according to some embodiments of the present disclosure.

The objective here is to construct a multilayer NoN 300 that represents the multimodal input data. FIG. 4 shows the overall pipeline of data collection and network construction. Given an event tag query 400, tag expansion 402 is performed. Tag expansion 402 refers to augmenting a set of keywords related to a targeted event in the event tag query 400 (e.g., "Ferguson Protest", "Boston Marathon Bombing") to include additional relevant keywords. For instance, "Ferguson Riot", "Ferguson Unrest," and "Boston Bombing." A tag/hashtag is the most common way of annotating and searching online social media posts (e.g., Twitter, Tumblr). Tag expansion 402 can be performed by either manually collecting a set of relevant tags, or performing the operation automatically by looking at the most frequently co-occurring tags/hashtags to the tag query 400.

Twitter posts with mentions of relevant event keywords (e.g., "Boston Marathon Bombing") are gathered from the GNIPI "decahose" subscription (element 404). Based on the collected tweets, additional web content, such as news and images, are obtained by crawling open sources linked by uniform resource locators (URLs) embedded in the tweets. For instance, an external content request 406, an internal content extraction 408, and external image retrieval 410 are performed. Once collected, the data is processed using standard neuro-linguistic programming (NLP) practices and methodologies (e.g., tokenizing, stemming, stop words removal). With respect to tweets, which tend to be very noisy, additional sanitization methods (tweet processing 412) are applied, such as the removal of hashtags, mentioned users, emojicons, and consecutively repeated words. A vector space model, based on term frequency, is used to extract features from textual data (text processing 414). It text mining, each document is represented using a vector, where each element corresponds to a textual term in the document. In other words, the vector space model is used to compute the textual similarity between two documents. Further, a convolutional neural network is used to extract features from image data (image processing 416). Convolutional neural network features are extracted as the signature (a feature vector) for each image. Subsequently, image similarity is computed using L2 distance on these feature vectors. The results of the tweet processing 412, the text processing 414, and the image processing 416 are stored in a text/news article database 418, a tweet database 420, and an image database 422, respectively.

In the NoN representation (element 300) according to embodiments of the present disclosure, each layer (element 306) captures information in a different modality. Referring to FIG. 3, nodes (represented by circles 308) correspond to information tokens, such as a tweet, an image, or a news article paragraph. Edges (e.g., line 310) linked within a layer are computed based on node similarities; edges linked across layers (e.g., line 312) are derived explicitly using the URLs embedded in the tweets. Each node is an information 'token', which could be a tweet, a news article, or an image. The similarity between textural contents (e.g., tweets, news articles) are computed using well-established cosine similarity based on a vector space model (e.g., TF-IDF). The similarity between image contents are computed using standard Euclidean distance (e.g., L2) between pairs of image feature vectors (i.e., convolutional neural network features described in Literature Reference No. 4).

Inter-layer edges (e.g., line 312) link complementary information tokens (e.g., a tweet, an image, a news article paragraph) that describe different aspects of the same event. Different modalities provide complimentary information regarding the same event. As a non-limiting example, there may be a news article describing the Ferguson protest, an image showing the scene of the Ferguson protest, and/or a message (e.g., tweet) posted on social media by someone expressing their opinion toward the protest. The inter-layer edges (e.g., line 312) link these types of complementary information tokens.

One of the main challenges in NoN construction is the computational task of measuring pairwise node similarity in a large data set. To address this bottleneck, pairwise similarity computations are implemented using efficient MapReduce algorithms (see Literature Reference No. 10 for a description of MapReduce algorithms) that exploit the parallel computing capability of Hadoop. The approach of the invention described herein breaks the similarity computation down into sequences of multiplication and summation steps for the vector space calculation with a term weighting scheme.

The NoN construction component in the system described herein is implemented in a modular fashion with a combination of well-adapted programming languages (see FIG. 4), such as Java, Python and Pig, which are among the most popular programming languages. Typical software development practice is used, and the code is implemented in a modual fashion. The output from this component is a large adjacency matrix representing the interconnected nodes and layers. The elements in the three main blocks of the matrix along diagonal direction represent intra-layer edges (e.g., line 310), and the rest of the elements represent inter-layer edges (e.g., line 312).

(3.1.2) NoN Ranking (Element 302)

The second system component involves NoN ranking (element 302), where the goal is to select and return a set of the top-k (e.g., 5, 10, 20 (k is user-defined)) tuples of a ranked list of tuples (each associated with a score) in order to capture event highlights. A non-limiting example is shown in FIG. 3 in which each tuple contains at most one node from each layer, and members of a tuple are connected via cross-layer edges. In FIG. 3, filled nodes (e.g., node 314) represent one tuple, and unfilled nodes (e.g., node 316) represent another tuple. The key challenge in selecting the set of tuples is that one wishes to simultaneously optimize multiple objectives: diversity aims to return nodes from each of the salient topics; importance aims to return nodes that are central with respect to their respective topics; and coherence aims to return tuples of nodes from the different modalities that are topically related (see Literature References 1 and 8 for a description of the criterial "coherence"). To satisfy all these criteria, an algorithm was developed based on absorbing random walks that is similar to the grasshopper method described in Literature Reference No. 12 for single-layer networks, with an additional matching element that forms coherent tuples that span across layers. In other words, within each single-layer network, a grasshopper method (described in Literature Reference No. 12) is performed; however, an additional step is added in the system and method described herein to form tuples by selecting and combining intermediate results computed by each grasshopper method in each of the layers.

Algorithm 1 (below) gives an overview of the ranking and tuple selection method (element 302) according to embodiments of the present disclosure. $M=(V, E)$ is used to denote a multilayer graph with $(i,j, l_i, l_j) \in E$ denoting an edge between nodes $i \in V$ and $j \in V$ in layers $l_i$ and $l_j$, respectively. Assume that each node only exists in a single layer. An intra-layer edge is one in which $l_i = l_j$ and an inter-layer edge is one in which $l_i \neq l_j$. A tuple $(i_1, i_2, \ldots, i_m)$ consists of a set of nodes in which $l_i \neq l_j$ for all $i, j \in (i_1, i_2, \ldots, i_m)$ and for each $i \in (i_1, i_2, \ldots, i_m)$, there exists a $j \in \{i_1, i_2, \ldots, i_m\}$ such that $(i, j, l_i, l_j) \in E$.

A random walk on a single-layer graph $G=(V, E)$ is a discrete-time stochastic process in which a walker in node v at time t transitions to node u at time t+1 along edge (v, u) with probability proportional to the degree of node v. An absorbing random walk is a random walk in which there exists one or more nodes from which the walker cannot transition out of. Finally, the ranking algorithm (element 302) according to embodiments of the present disclosure uses a "fitness function" to determine the score of a tuple based on the elements' individual scores. For a tuple $(v_1, \ldots, v_l)$ spanning l layers $f(v_1, \ldots, v_l)$ is used to denote this quantity. The fitness function is the selection criteria defined in mathematical terms. The goal is to maximize the outcome of the fitness function. In the invention described herein, the fitness function is defined as the sum of the individual node scores from each layer. The individual node scores are computed using the grasshopper method (described above). It is assumed that after running the grasshopper method, each node (within a layer) is associated with a numerical score.

(3.1.3) Storytelling (Element 304)

The final component of NoN summarization is storytelling, in which NoN tuples are linked across time to construct a coherent collection of event storylines. Each storyline needs to be succinct and should reflect their respective stories in a natural way, allowing for the merging and splitting of the individual storylines as they develop.

The generation of summarization storylines have been explored in the context of single-layer networks. For example, the authors of Literature Reference No. 9 developed a flow-based method that creates a summary by partitioning a graph into clusters that maximize the inter-cluster flow. Kim and Xing (see Literature Reference No. 6) used another clustering approach to create storylines in a large image dataset.

Figure 5:
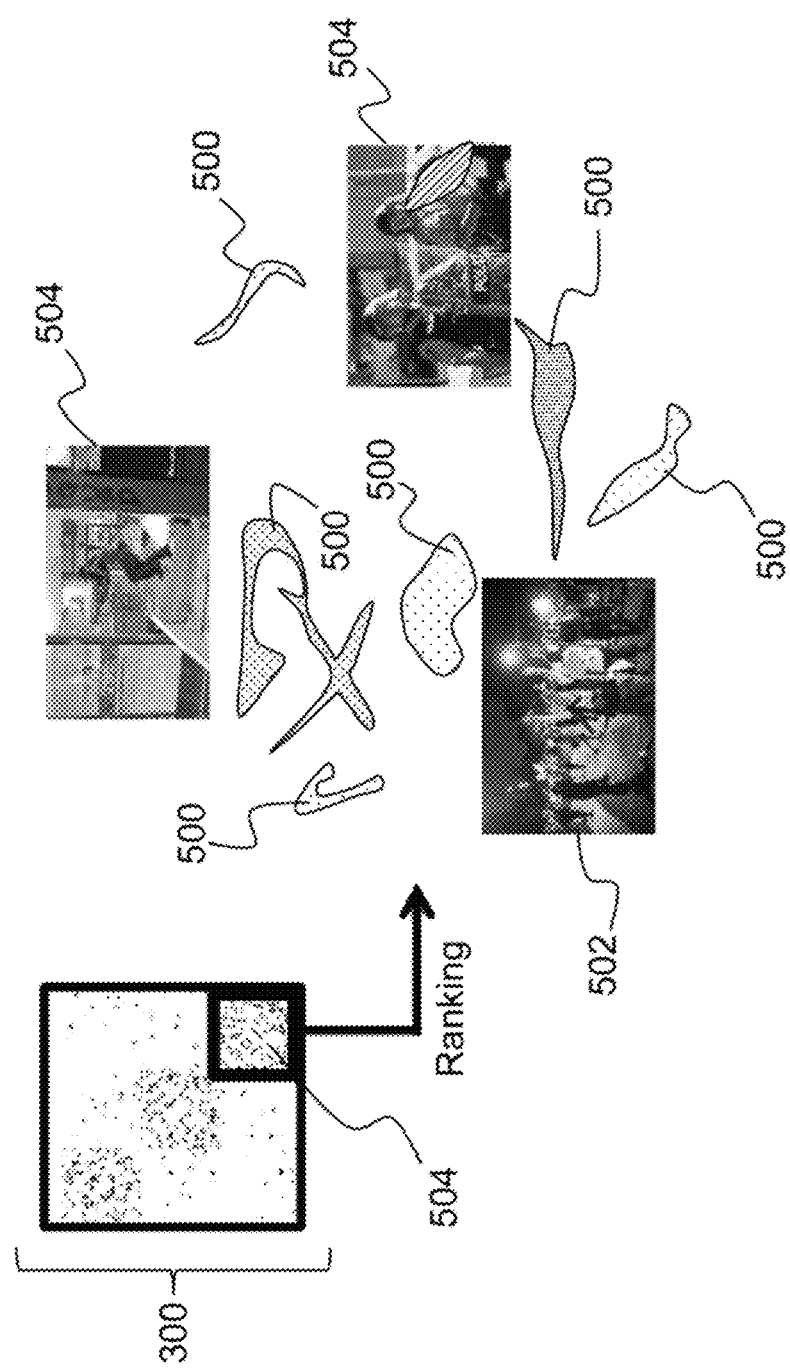
FIG. 5 is an illustration of topic clusters from an image layer of the NoN according to some embodiments of the present disclosure.

In the system described herein, an approach that reduces to solving instances of the longest path problem on a directed acyclic graph (DAG) was developed. Essentially, the system stitches together a sequence of tuples, where each tuple is the output of the ranking algorithm described in Section (3.1.2). Let $C_1, \ldots, C_T$ be the tuples returned after running Algorithm 1 (below) on T consecutive days. FIG. 5 depicts topic clusters 500 obtained from images 502 from the image layer (element 504) of the NoN (element 300). Distinct patterns indicate different topic clusters.

Algorithm 1: NoN Ranking
Input: Multilayer graph M=(V, E), tuple valuation function $f$ and integer k>0.
Output: Collection of k Tuples
1. Make M directed by replacing each undirected edge with two directed edges.
2. C←∅
3. for all i=1, 2, . . . , k do
4. Rank the nodes in each layer (using only intra-layer links) according to their expected number of visits by a walker before reaching an absorbing node.
5. Find a tuple $(v_1, v_2, \ldots, v_l)$ whose elements are connected and maximize $f(v_1, v_2, \ldots, v_l)$.
6. C←C∪{$(v_1, v_2, \ldots, v_l)$}.
7. Make nodes $v_1, v_2, \ldots, v_l$ absorbing nodes by replacing all out-going edges with self-loops.
8. end for
9. Return C A timeline graph T=(U, E) is constructed with nodes U=U$_i$ C$_i$, so that each node in a tuple is represented by a node in $\mathcal{T}$. Next the edges E are specified to be the collection of directed edges $(u_i, v_j)$ such that $u_i \in C_i$ and $v_j \in C_j$ and j>i. This ensures that the edges "point forward in time." The edges are assigned a non-negative edge weight based on the similarity of the content represented by their constituent nodes, with some temporal discounting. Finally, given $\mathcal{T}$, the storyline selection process is performed, which is described in Algorithm 2 (below). At its core, Algorithm 2 makes multiple calls to a subroutine that solves a special case of the longest-path problem. This is accomplished by simply running a shortest-path algorithm (see Literature Reference No. 13) on the graph $-\mathcal{T}$, obtained by negating all of the edge weights. To account for storylines that split, Algorithm 2 is rerun using the graph $\hat{\mathcal{T}}$, which is obtained from using the tuples $\hat{C}_i = C_{T+1-i}$ for all i={1, . . . , T}. The resulting storylines S are merged with the storylines S generated from $\mathcal{T}$, giving the final result.

Algorithm 2: Storytelling
Input: $\mathcal{T}$ =(U, E) is a storyline graph spanning T days.
Output: Storylines S
1. S←∅
2. for all t=1, 2, . . . , T do
3. for all u∈U such that u∈C$_t$ do
4. if u∉P for every P∈S then
5. P←longest path in G starting from u.
6. S←S∪{P}.
7. end if
8. end for
9. end for
10. Return S (3.2) Experimental Studies The system according to embodiments of the present disclosure was demonstrated using datasets covering the 2014 National Collegiate Athletic Association (NCAA) "March Madness" collegiate basketball tournament, and the 2014 Ferguson unrest following the fatal police shooting of Michael Brown. The NCAA dataset covers 21 days, from March 20 to April 9, and includes 106,868 tweets, 7,261 images, 12,553 news articles. The Ferguson dataset covers 6 days, from August 9 to August 14, and includes 71,380 tweets, 10,972 images, 17,316 news articles.

Figure 6A:
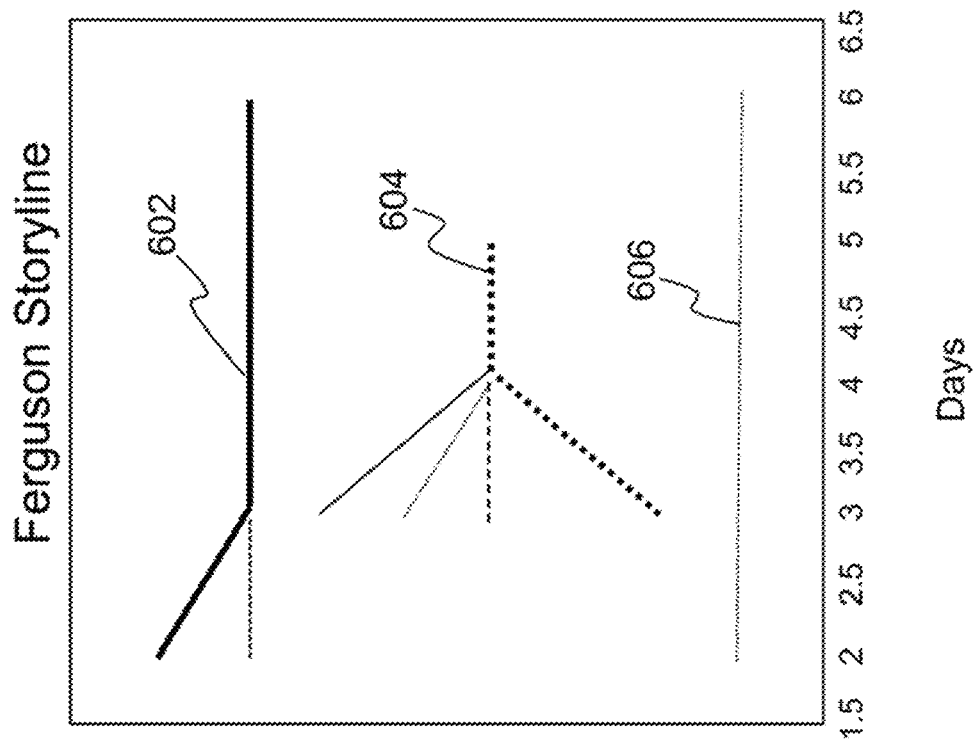
FIG. 6A is an illustration of storylines generated for National Collegiate Athletic Association (NCAA) "March Madness" events according to some embodiments of the present disclosure.
Figure 6B:
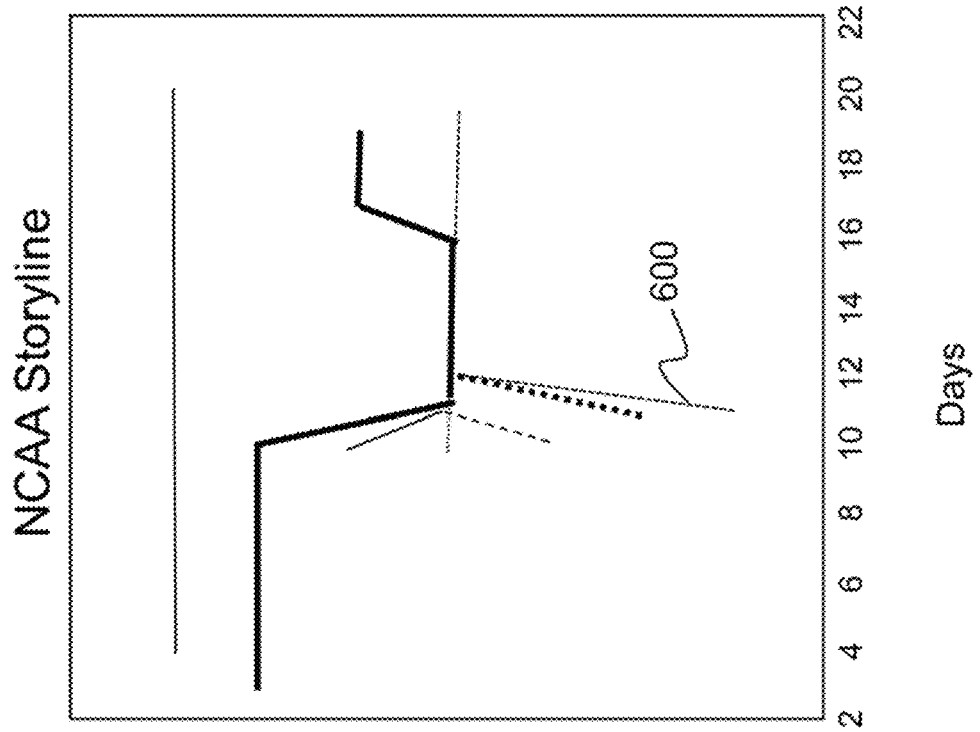
FIG. 6B is an illustration of storylines generated for Ferguson unrest events according to some embodiments of the present disclosure.

For each day of each event, the NoN construction was performed and the ranking algorithm was used to select the top 15 tuples. This generated 21 and 6 collections with 15 tuples per collection for the NCAA and Ferguson datasets, respectively. Finally, using the method described herein storylines were created for these two datasets. FIGS. 6A and 6B depict storylines (denoted by various line types) generated for the NCAA "March Madness" and Ferguson unrest datasets, respectively. In FIG. 6A, line 600 represents a sample storyline from the NCAA dataset that follows the University of Connecticut team's victory in a Final Four round. FIG. 7 lists sample tweets corresponding to the NCAA storyline depicted as line 600.

In FIG. 6B, the three parallel lines 602, 604, and 606 correspond to three major sentiments toward the event sympathy, angry, and sarcasm. One can observe some diversity in the form that the resulting storylines follow, with some stories being more persistent while others are more short-lived. Diversity, in this context, can be viewed as differences in how long a specific topic is described in data sources. Additionally, some storylines merge and split, indicating periods of convergence for otherwise distinct storylines.

To evaluate the storylines generated by the system, the relevance and diversity of the tweets/images/news that comprised each story was qualitatively assessed. For relevance, each storyline was given a score of 1 or 0 depending on whether it was consistently on-topic (1) or off-topic (0), and then these scores were averaged for the top-k storylines. Similarly, the diversity of a collection of the top-k storylines was evaluated to reflect the fraction of storylines that covered the same prevailing sequence of events (i.e., how close the stories are to one another). These results are presented in FIGS. 8A and 8B, which depict an evaluation of the relevance (FIG. 8A) and diversity (FIG. 8B) of the content embedded in the top-k (for k=3, 6, 9) storylines shown in FIGS. 6A and 6B. In FIGS. 8A and 8B, filled bars 800 represent NCAA storylines, while unfilled bars 802 represent Ferguson storylines.

Applications for the invention described in this disclosure include, but are not limited to, business operations such as monitoring public opinions and sentiments toward products, promotions, and recalls. For example, when a new product (e.g., vehicle) is released, the system described herein can assist system analysts in monitoring and understanding the reactions and opinions that the general public has towards the new product. For instance, the system could analyze and summarize the online discussions regarding the new product from different media sources. The analysis could then be used by the manufacturer of the new product to determine whether to offer promotions to assist in product sales, or whether to recall a product based on negative consumer experiences collected.

Additionally, the system described herein can be used for intelligence applications, such as understanding adversarial intent for anti-terrorist operations. For instance, the invention according to embodiments of this disclosure can summarize a workflow of a terrorist group or an illegal drug production by analyzing intelligence data sources. Furthermore, general progression of an event, such as the NCAA tournament, can be monitored using the system described herein, and a temporal summary (or storyline) of the event can be generated. The storyline can be output via a display or a network card, through a social network, by email, or by any other suitable manner to electronically communicate the storyline to an end-user.

Furthermore, the system can operate to induce automated responses based on storylines. For instance, if two or more storylines converge, then a newsfeed related to the storyline event can be caused to be displayed to social media users. As another non-limiting example, if two storylines related to opinions regarding a consumer product converge, then the system described herein can generate and cause an advertisement related to the product to be displayed to social media users.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while method steps have been recited in an order, the method steps may occur in any desired order and fall within the scope of the present invention.

What is claimed is:

1. A system for automated event summarization, the system comprising:
    one or more processors and a non-transitory computer-readable medium having executable instructions encoded thereon such that when executed, the one or more processors perform operations of:
    connecting electronically with a plurality of media networks and automatically acquiring temporal event data related to an event from a plurality of multimodal data sources;
    using the temporal event data, generating a multi-layer network comprising:
        a plurality of layers, a plurality of nodes within each layer, at least one inter-layer edge connecting nodes between layers, and at least one intra-layer edge within each layer connecting nodes within the layer, wherein each layer comprises temporal event data from a distinct data source, wherein each node represents an information token, and wherein the nodes within each layer represent information tokens obtained from a distinct data source;
    forming, from the plurality of nodes, a plurality of tuples that maximize an objective function, wherein the nodes that form each tuple are connected via inter-layer edges;
    assigning a fitness score to each tuple according to the objective function;
    ranking the plurality of tuples according to their fitness scores;
    based on the ranking, selecting tuples in different modalities from each layer to represent temporal event highlights;
    linking the temporal event highlights into a temporal event progression of temporal event highlights; and
    electronically communicating the temporal event progression.

2. The system as set forth in claim 1, wherein the one or more processors further perform an operation of generating a storyline comprising opinions regarding the event by fusing temporal event highlights from multiple media types.

3. The system as set forth in claim 1, wherein the one or more processors further perform an operation of causing an advertisement related to a consumer product to be displayed to one or more social media users.

4. The system as set forth in claim 1, wherein intra-layer edges are computed based on node similarities, and wherein inter-layer edges link complementary information tokens of different modalities representing the event.

5. The system as set forth in claim 1, wherein the one or more processors perform an operation of stitching selected tuples together in a temporal sequence to generate a storyline.

6. The system as set forth in claim 5, wherein selected tuples are stitched together using a shortest-path algorithm.

7. The system as set forth in claim 1, wherein the multimodal data set comprises microblog posts, news articles, and images that describe at least one of current attitudes, trends, and events being shared online.

8. The system as set forth in claim 1, wherein members of a tuple are connected via cross-layer edges.

9. The system as set forth in claim 1, wherein in selecting the at least one set of tuples, the one or more processors further perform an operation of simultaneously optimizing a plurality of objectives, wherein the plurality of objectives comprises:
    an objective to return nodes from each of a set of topics;
    an objective to return nodes that are central with respect to their respective topics; and
    an objective to return tuples of nodes from different modalities that are topically related.

10. The system as set forth in claim 1, wherein the fitness score is a sum of individual node scores from each layer, wherein the individual node scores are computed using a random walk method.

11. The system as set forth in claim 1, wherein the temporal event progression is electronically communicated through at least one of a display, a network card, a social network, and electronic mail.

12. A computer implemented method for automated event summarization, the method comprising an act of:
causing one or more processers to execute instructions encoded on a non-transitory computer-readable medium, such that upon execution, the one or more processors perform operations of:
connecting electronically with a plurality of media networks and automatically acquiring temporal event data related to an event from a plurality of multimodal data sources;
using the temporal event data, generating a multi-layer network comprising:
a plurality of layers, a plurality of nodes within each layer, at least one inter-layer edge connecting nodes between layers, and at least one intra-layer edge within each layer connecting nodes within the layer, wherein each layer comprises temporal event data from a distinct data source, wherein each node represents an information token, and wherein the nodes within each layer represent information tokens obtained from a distinct data source;
forming, from the plurality of nodes, a plurality of tuples that maximize an objective function, wherein the nodes that form each tuple are connected via inter-layer edges;
assigning a fitness score to each tuple according to the objective function;
ranking the plurality of tuples according to their fitness scores;
based on the ranking, selecting tuples in different modalities from each layer to represent temporal event highlights;
linking the temporal event highlights into a temporal event progression of temporal event highlights; and
electronically communicating the temporal event progression.

13. The method as set forth in claim 12, wherein the one or more processors further perform an operation of generating a storyline comprising opinions regarding the event by fusing temporal event highlights from multiple media types.

14. The method as set forth in claim 12, wherein the one or more processors further perform an operation of causing an advertisement related to a consumer product to be displayed to one or more social media users.

15. The method as set forth in claim 12, wherein intra-layer edges are computed based on node similarities, and wherein inter-layer edges link complementary information tokens of different modalities representing the event.

16. The method as set forth in claim 12, wherein the one or more processors perform an operation of stitching selected tuples together in a temporal sequence to generate a storyline.

17. The method as set forth in claim 16, wherein selected tuples are stitched together using a shortest-path algorithm.

18. The system as set forth in claim 13, wherein to simultaneously optimize the plurality of objectives, the one or more processors further perform an operation of:
forming tuples by selecting and combining a set of intermediate results computed by applying a random walk method in each of the layers, such that tuples are formed that span across layers.

19. A computer program product for automated event summarization, the computer program product comprising:
computer-readable instructions stored on a non-transitory computer-readable medium that are executable by a computer having one or more processors for causing the processor to perform operations of:
connecting electronically with a plurality of media networks and automatically acquiring temporal event data related to an event from a plurality of multimodal data sources;
using the temporal event data, generating a multi-layer network comprising:
a plurality of layers, a plurality of nodes within each layer, at least one inter-layer edge connecting nodes between layers, and at least one intra-layer edge within each layer connecting nodes within the layer, wherein each layer comprises temporal event data from a distinct data source, wherein each node represents an information token, and wherein the nodes within each layer represent information tokens obtained from a distinct data source;
forming, from the plurality of nodes, a plurality of tuples that maximize an objective function, wherein the nodes that form each tuple are connected via inter-layer edges;
assigning a fitness score to each tuple according to the objective function;
ranking the plurality of tuples according to their fitness scores;
based on the ranking, selecting tuples in different modalities from each layer to represent temporal event highlights;
linking the temporal event highlights into a temporal event progression of temporal event highlights; and
electronically communicating the temporal event progression.

20. The computer program product as set forth in claim 19, wherein intra-layer edges are computed based on node similarities, and wherein inter-layer edges link complementary information tokens of different modalities representing the event.

21. The computer program product as set forth in claim 19, further comprising instructions for causing the one or more processors to further perform an operation of stitching selected tuples together in a temporal sequence to generate a storyline.

22. The computer program product as set forth in claim 21, wherein selected tuples are stitched together using a shortest-path algorithm.

* * * * *